Figure 1:
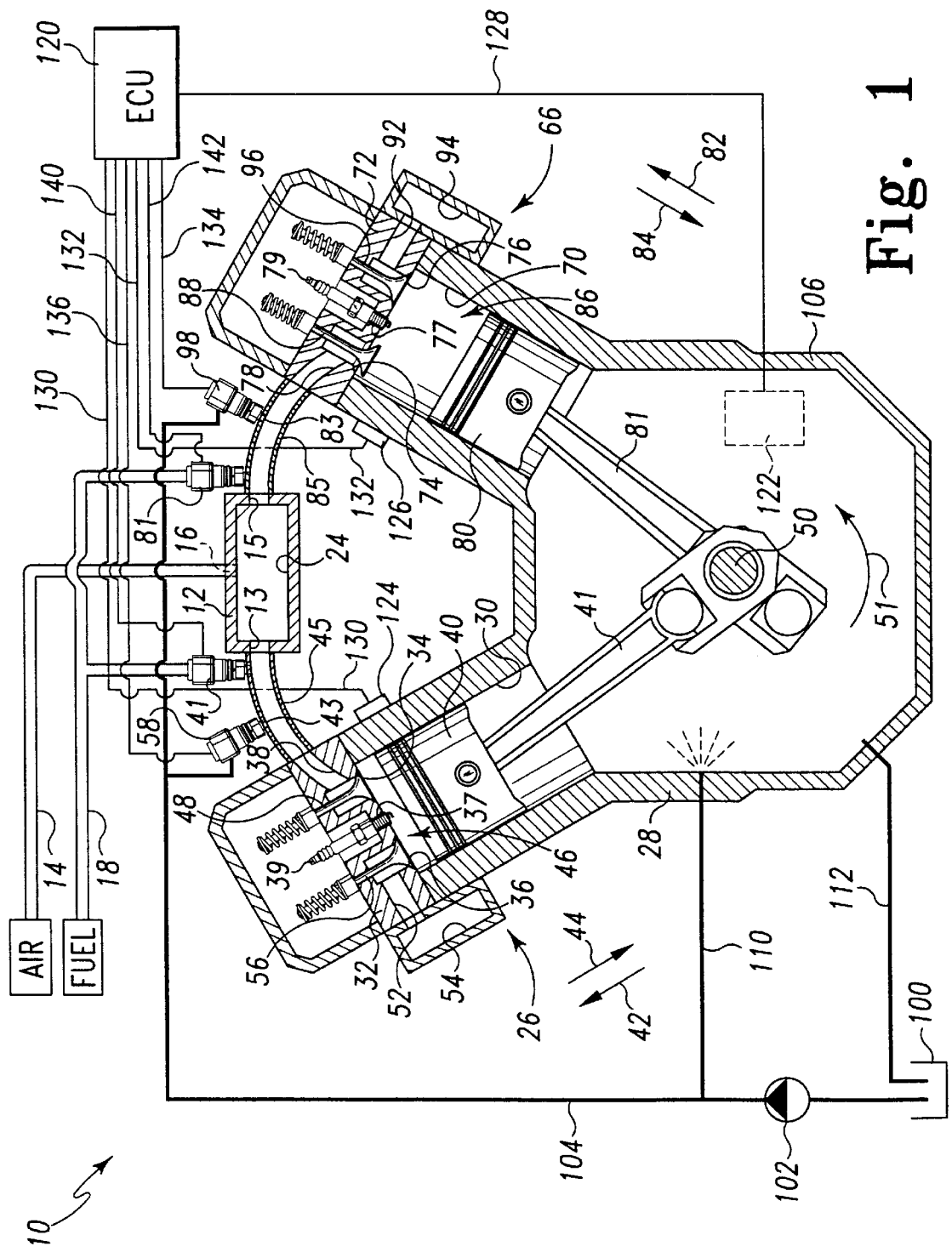

United States Patent [19]
Willi et al.

[11] Patent Number: 5,870,978
[45] Date of Patent: Feb. 16, 1999

[54] DUAL FUEL ENGINE WHICH UTILIZES VALVE LUBRICANT AS A PILOT FUEL

[75] Inventors: Martin L. Willi; Min Wu, both of Lafayette, Ind.; Jeffrey T. Fischer, Brimfield, Ill.

[73] Assignee: Caterpillar Inc., Peoria, Ill.

[21] Appl. No.: 79,350

[22] Filed: May 15, 1998

[51] Int. Cl.$^6$ ...................................................... F02B 7/06
[52] U.S. Cl. .................... 123/27 GE; 123/525; 123/526; 123/575
[58] Field of Search .............................. 123/27 GE, 526, 123/525, 575

[56] References Cited

U.S. PATENT DOCUMENTS

| | | | |
|---|---|---|---|
| Re. 26,145 | 1/1967 | Friddell . | |
| 2,686,503 | 8/1954 | Reddy et al. | 123/27 GE |
| 4,091,772 | 5/1978 | Heater et al. | 123/575 |
| 4,524,730 | 6/1985 | Doell et al. | 123/27 GE |
| 4,527,516 | 7/1985 | Foster | 123/27 GE |
| 4,603,674 | 8/1986 | Tanaka | 123/575 |
| 4,708,094 | 11/1987 | Helmich et al. | 123/27 GE |
| 4,754,733 | 7/1988 | Steiger | 123/299 |
| 4,831,993 | 5/1989 | Kelgard | 123/525 |
| 5,035,206 | 7/1991 | Welch et al. | 123/27 GE |
| 5,139,002 | 8/1992 | Lynch et al. | 123/575 |
| 5,315,973 | 5/1994 | Hill et al. | 123/304 |
| 5,450,829 | 9/1995 | Beck | 123/435 |
| 5,515,829 | 5/1996 | Wear et al. | 123/446 |

Primary Examiner—Henry C. Yuen
Assistant Examiner—Hai Huynh
Attorney, Agent, or Firm—Paul J. Maginot

[57] ABSTRACT

An engine assembly includes a plenum member having an inlet opening and an outlet opening defined therein. The engine assembly further includes an air source in fluid communication with the inlet opening. The engine assembly still further includes a fuel combustion assembly having an engine block having a piston cylinder defined therein, an engine head secured to the engine block and having an intake port defined therein, and a piston which translates within the piston cylinder. The piston, the piston cylinder, and the engine head cooperate so as to define a combustion chamber. The engine assembly further includes a gaseous fuel supply valve which controls the amount of gaseous fuel advanced from a gaseous fuel source to the first intake conduit. The engine assembly still further includes an intake conduit interposed between the outlet opening and the intake port. The engine assembly still further includes a port oil injector operable to inject lubricating oil through an oil opening in the intake conduit and an intake valve positionable between an open position and a closed position. The lubricating oil lubricates the intake valve as the lubricating oil advances from the intake conduit to the combustion chamber during an intake stroke of the engine assembly, and combusts so as to ignite the mixture of natural gas and air in the combustion chamber during a compression stroke of the engine assembly. A method of operating the engine assembly is also disclosed.

20 Claims, 1 Drawing Sheet

DUAL FUEL ENGINE WHICH UTILIZES VALVE LUBRICANT AS A PILOT FUEL

TECHINAL FIELD OF THE INVENTION

The present invention relates generally to a dual fuel engine, and more specifically to a dual fuel engine which utilizes valve lubricant as a pilot fuel.

BACKGROUND OF THE INVENTION

Natural gas has several advantages over other hydrocarbon fuels that are combusted in internal combustion engines. For example, natural gas is less expensive relative to other hydrocarbon fuels. Moreover, for example, natural gas burns cleaner during operation of the internal combustion engine relative to other hydrocarbon fuels. By burning cleaner, a reduced amount of combustion byproducts such as carbon monoxide, oxides of nitrogen or hydrocarbons are released into the environment during operation of the internal combustion engine. In addition, because lubricants of the internal combustion engine become contaminated with the combustion byproducts over a time period, the production of a reduced amount of combustion byproducts results in less contamination of the lubricants over the time period thereby increasing the useful life of the lubricants.

One type of internal combustion engine is a diesel engine. Diesel engines combust fuel by compressing a mixture of air and fuel to a point where the fuel is ignited by heat which results from such compression. When natural gas is used as a fuel in a diesel engine, the natural gas does not readily ignite as it is compressed. In order to overcome this problem, an ignition source is provided to ignite the natural gas. The ignition source may be provided by a spark plug similar to those used in spark ignition engines. However, in certain types of diesel engines (e.g. dual fuel engines), the ignition source is provided by injecting a small amount of diesel fuel with a pilot fuel injector into the mixture of air and natural gas. As the mixture of air, natural gas, and diesel fuel is compressed, the diesel fuel ignites, which in turn ignites the natural gas.

In larger types of diesel engines, it is common to lubricate the intake valves of the combustion chambers. Such lubrication increases the life of the diesel engine. In this regard, a typical lubricating system would include an oil injector positioned to advance a small quantity of lubricating oil into an intake manifold of the diesel engine. During an intake stroke of the engine, the lubricating oil is advanced from the intake manifold to the combustion chamber through the intake valve. Accordingly, as the lubricating oil is advanced through the intake valve, lubricating oil is deposited on the components of the intake valve, such as the valve member.

There have been instances, during operation of a dual fuel diesel engine which incorporates a lubricating system for the intake valve, where the diesel engine continues to combust natural gas even after failure of the pilot fuel injector. One explanation for the continuing combustion of the natural gas is that the flow of lubricating oil provided by the lubricating system which is ultimately advanced into the combustion chamber functions as an ignition source for the natural gas. In particular, as the lubricating oil is compressed within the combustion chamber, the lubricating oil ignites so as to ignite the natural gas in a manner similar to diesel pilot fuel.

Pilot fuel injectors which are used to inject pilot fuel directly into the combustion chamber are relatively expensive as compared to other fuel injectors which do not inject pilot fuel directly into the combustion chamber. This is true since the former fuel injectors must be specially constructed to withstand the temperature and pressure associated with combustion. Thus, eliminating the need of these specially constructed fuel injectors is desirable.

What is needed therefore is a dual fuel diesel engine having a single fuel injector that injects lubricating fuel oil which (i) functions to lubricate the intake valve of the combustion chamber, as well as (ii) functions as an ignition source for the natural gas within the combustion chamber.

DISCLOSURE OF THE INVENTION

In accordance with a first embodiment of the present invention, there is provided an engine assembly which includes a plenum member having an inlet opening and an outlet opening defined therein. The engine assembly further includes an air source in fluid communication with the inlet opening. The engine assembly still further includes a fuel combustion assembly having an engine block with a piston cylinder defined therein, an engine head secured to the engine block and having an intake port defined therein, and a piston which translates within the piston cylinder. The piston, the piston cylinder, and the engine head cooperate so as to define a combustion chamber. The engine assembly still further includes an intake conduit interposed between the outlet opening and the intake port so as to provide fluid communication between the plenum member and the combustion chamber. The intake conduit has an oil opening defined therein. The engine assembly further includes a gaseous fuel source in fluid communication with the intake conduit and a gaseous fuel supply valve which controls the amount of gaseous fuel advanced from the gaseous fuel source to the intake conduit. The engine assembly still further includes a port oil injector operable to inject lubricating oil through the oil opening and an intake valve positionable between an open position and a closed position. The intake valve enables fluid communication between the intake port and the combustion chamber when the intake valve is positioned in the open position. The intake valve prevents fluid communication between the intake port and the combustion chamber when the intake valve is positioned in the closed position. The lubricating oil lubricates the intake valve as the lubricating oil advances from the intake conduit to the combustion chamber during an intake stroke of the engine assembly, and combusts so as to ignite a mixture of gaseous fuel and air in the combustion chamber during a compression stroke of the engine assembly.

In accordance with a second embodiment of the present invention, there is provided a method of operating an engine assembly. The engine assembly includes a plenum member having an outlet opening defined therein, a fuel combustion assembly which includes an engine block having a piston cylinder defined therein, an engine head secured to the engine block and having an intake port defined therein, and a piston which translates within the piston cylinder. The piston, the piston cylinder, and the engine head cooperate so as to define a combustion chamber. The engine assembly further includes an intake conduit interposed between the outlet opening and the intake port so as to provide fluid communication between the plenum member and the combustion chamber. The intake conduit has an oil opening defined therein. The engine assembly further includes a gaseous fuel supply valve operable to advance gaseous fuel from a gaseous fuel source to the intake conduit. The engine assembly yet further includes a port oil injector operable to inject lubricating oil through the oil opening, and an intake valve positionable between an open position and a closed position. The intake valve enables fluid communication between the intake port and the combustion chamber when the intake valve is positioned in the open position. The intake valve prevents fluid communication between the intake port and the combustion chamber when the intake valve is positioned in the closed position. The method includes the step of advancing gaseous fuel through the plenum member, through the intake conduit, and into the combustion chamber during an intake stroke of the engine assembly. The method further includes the step of injecting lubricating oil with the port oil injector through the oil opening of the intake conduit. The method still further includes the step of advancing the lubricating oil from the intake conduit to the combustion chamber during the intake stroke of the engine assembly, whereby the lubricating oil lubricates the intake valve during the advancing step. The method yet further includes the step of combusting the lubricating oil in the combustion chamber so as to ignite the gaseous fuel during a compression stroke of the engine assembly.

In accordance with a third embodiment of the present invention, there is provided an engine assembly which includes a plenum member having an inlet opening, a first outlet opening, and a second outlet opening defined therein and an air in fluid communication with the inlet opening. The engine assembly further includes an engine block having a first piston cylinder and a second piston cylinder defined therein, a first engine head secured to the engine block and having a first intake port defined therein, and a second engine head secured to the engine block and having a second intake port defined therein. The engine assembly still further includes a first piston which translates within the first piston cylinder, wherein the first piston, the first piston cylinder, and the first engine head cooperate so as to define a first combustion chamber and a second piston which translates within the second piston cylinder, wherein the second piston, the second piston cylinder, and the second engine head cooperate so as to define a second combustion chamber. The engine assembly yet further includes a first intake conduit interposed between the first outlet opening and the first intake port so as to provide fluid communication between the plenum member and the first combustion chamber. The first intake conduit having a first oil opening defined therein. The engine assembly still further includes a second intake conduit interposed between the second outlet opening and the second intake port so as to provide fluid communication between the plenum member and the second combustion chamber. The second intake conduit having a second oil opening defined therein. The engine assembly further includes a gaseous fuel source in fluid communication with the first intake conduit and the second intake conduit, a first gaseous fuel supply valve which controls the amount of gaseous fuel advanced from the gaseous fuel source to the first intake conduit, and a second gaseous fuel supply valve which controls the amount of gaseous fuel advanced from the gaseous fuel source to the second intake conduit. The engine assembly still further includes a first port oil injector operable to inject lubricating oil through the first oil opening and a second port oil injector operable to inject lubricating oil through the second oil opening. The engine assembly yet further includes a first intake valve positionable between a first intake valve open position and a first intake valve closed position. The first intake valve enables fluid communication between the first intake port and the first combustion chamber when the first intake valve is positioned in the first intake valve open position. The first intake valve prevents fluid communication between the first intake port and the first combustion chamber when the first intake valve is positioned in the first intake valve closed position. The engine assembly still further includes a second intake valve positionable between a second intake valve open position and a second intake valve closed position. The second intake valve enables fluid communication between the second intake port and the second combustion chamber when the second intake valve is positioned in the second intake valve open position. The second intake valve prevents fluid communication between the second intake port and the second combustion chamber when the second intake valve is positioned in the second intake valve closed position. The lubricating oil lubricates the first intake valve as the lubricating oil advances from the first intake conduit to the first combustion chamber during a first piston intake stroke, and combusts so as to ignite a first mixture of gaseous fuel and air in the first combustion chamber during a first piston compression stroke. The lubricating oil lubricates the second intake valve as the lubricating oil advances from the second intake conduit to the second combustion chamber during a second piston intake stroke, and combusts so as to ignite a second mixture of gaseous fuel and air in the second combustion chamber during a second piston compression stroke.

BRIED DESCRIPTION OF THEW DRAWIMGS

FIG. 1 is a partial cross sectional, partial schematic view of a dual fuel engine which incorporates the features of the present invention therein.

BEST MODE FOR CARRYING OUT THE INVENTION

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring now to FIG. 1, there is shown an engine assembly 10. The engine assembly 10 includes a plenum member 12, and an air source 14. The plenum member 12 has an inlet opening 16, a first outlet opening 13 and a second outlet opening 15 defined therein. The air source 14 supplies air to the inlet opening 16. The air from the air source 14 advances into a plenum chamber 24 defined in the plenum member 12 via the inlet opening 16. The engine assembly 10 further includes a first fuel combustion assembly or first cylinder assembly 26. The cylinder assembly 26 includes a block 28 having a first piston cylinder 30 defined therein. A first engine head 32 is secured to the block 28. The first engine head 32 has a first intake port 34, a first exhaust port 36, and a first spark plug port 37 defined therein. A first intake conduit 38 places the first intake port 34 in fluid communication with the first exit opening 13 of the plenum member 12. A first exhaust conduit 52 places the first exhaust port 36 in fluid communication with a first exhaust manifold 54. A spark plug 39 is positioned within the first spark plug opening 37.

The engine assembly 10 further includes a first piston 40 which translates in the first piston cylinder 30 in the general direction of arrows 42 and 44. As the first piston 40 moves downwardly in the general direction of arrow 44 from the position shown in FIG. 1, a first connecting rod 41 urges a crankshaft 50 to rotate in the general direction of arrow 51. Subsequently, as the crankshaft 50 continues to rotate in the general direction of arrow 51, the crankshaft 50 urges the first connecting rod 41 and the first piston 40 in the general direction of arrow 42 to return the first piston 40 to the position shown in FIG. 1.

The first piston 40, the first piston cylinder 30, and the first engine head 32 cooperate so as to define a first combustion chamber 46. In particular, when the first piston 40 is advanced in the general direction of arrow 42, the volume of the first combustion chamber 46 is decreased to the volume shown in FIG. 1. On the other hand, when the first piston 40 is advanced in the general direction of arrow 44, the volume of the first combustion chamber 46 is increased. The spark plug 39 is operable to provide an electrical spark to the first combustion chamber 46.

The engine assembly 10 further includes a gaseous fuel source 18 in fluid communication with the first intake conduit 38. A first gaseous fuel supply valve 41 controls the amount of gaseous fuel, such as natural gas, in a first mixture of air and gaseous fuel advanced to the first intake conduit 38. In particular, the first gaseous fuel supply valve 41 moves between an open position which advances gaseous fuel to the first intake conduit 38 and a closed position which prevents advancement of gaseous fuel to the first intake conduit 38. It should be appreciated that the amount of gaseous fuel advanced by the first gaseous fuel valve 41 controls the ratio of air to gaseous fuel, or air-fuel ratio, advanced to the first combustion chamber 46. Specifically, if it is desired to advance a leaner mixture to the first combustion chamber 46, the first gaseous fuel valve 41 is operated to advance less fuel to the first intake conduit 38. On the other hand, if it is desired to advance a richer mixture to the first combustion chamber 46, the first gaseous fuel valve 41 is operated to advance more gaseous fuel to the first intake conduit 38.

A first intake valve 48 selectively places the plenum chamber 24 in fluid communication with the first combustion chamber 46. The first intake valve 48 is actuated in a known manner by a camshaft (not shown), a pushrod (not shown), and a rocker arm (not shown) driven by the rotation of the crankshaft 50. When the first intake valve 48 is placed in the open position (not shown) air and gaseous fuel is advanced from the first intake conduit 38 to the first combustion chamber 46 via the first intake port 34. When the first intake valve 48 is placed in the closed position (shown in FIG. 1) gaseous fuel is prevented from advancing from the first intake conduit 38 to the first combustion chamber 46 since the first intake valve 48 blocks fluid flow through the first intake port 34.

A first exhaust valve 56 selectively places the first exhaust manifold 54 in fluid communication with the first combustion chamber 46. The first exhaust valve 56 is actuated in a known manner by a camshaft (not shown), a pushrod (not shown), and a rocker arm (not shown) each of which are driven by the rotation of the crankshaft 50. When the first exhaust valve 56 is placed in the open position (not shown) exhaust gases are advanced from the first combustion chamber 46 to the first exhaust manifold 54 via a fluid path that includes the first exhaust port 36 and the first exhaust conduit 52. When the first exhaust valve 56 is placed in the closed position (shown in FIG. 1) exhaust gases are prevented from advancing from the first combustion chamber 46 to the first exhaust manifold 54 since the first exhaust valve 56 blocks fluid flow through the first exhaust port 36.

The first intake conduit 38 further includes a side wall 45 having a first oil opening 43 defined therein. A first port oil injector 58 is positioned proximate to the first intake conduit 38. In particular, a nozzle (not shown) of the first port oil injector 50 is received through the first oil opening 43 such that the first port oil injector 58 is operable to inject a quantity of lubricating oil into the first intake conduit 38. It should be appreciated that the quantity of lubricating oil is advanced to the first combustion chamber 46 when the first intake valve 48 is positioned in the open position. It should further be appreciated that the lubricating oil passes around the first intake valve 48 so as to lubricate the first intake valve 48 when the lubricating oil is advanced to the first combustion chamber 46.

The engine assembly 10 further includes a second fuel combustion assembly or second cylinder assembly 66. The second cylinder assembly 66 includes the block 28 having a second piston cylinder 70 defined therein. A second engine head 72 is secured to the block 28. The second engine head 72 has a second intake port 74, a second exhaust port 76, and a second spark plug port 77 defined therein. A second intake conduit 78 places the second intake port 74 in fluid communication with the second exit opening 15 of the plenum member 12. A second exhaust conduit 92 places the second exhaust port 76 in fluid communication with a second exhaust manifold 94. A spark plug 79 is positioned within the second spark plug opening 77.

The engine assembly 10 further includes a second piston 80 which translates in the second piston cylinder 70 in the general direction of arrows 82 and 84. As the second piston 80 moves downwardly in the general direction of arrow 84 a second connecting rod 81 urges the crankshaft 50 to the position shown in FIG. 1 which rotates the crankshaft 50 in the general direction of arrow 51. Subsequently, as the crankshaft 50 continues to rotate in the general direction of arrow 51, the crankshaft 50 urges the second connecting rod 81 and the second piston 80 in the general direction of arrow 82.

The second piston 80, the second piston cylinder 70, and the second engine head 72 cooperate so as to define a second combustion chamber 86. In particular, when the second piston 80 is advanced in the general direction of arrow 82, the volume of the second combustion chamber 86 is decreased. On the other hand, when the second piston 80 is advanced in the general direction of arrow 84, the volume of the second combustion chamber 86 is increased to the volume shown in FIG. 1. The spark plug 79 is operable to provide an electrical spark to the second combustion chamber 86.

The gaseous fuel source 18 is also in fluid communication with the second intake conduit 78. A second gaseous fuel supply valve 81 controls the amount of gaseous fuel advanced to the second intake conduit 38. In particular, the second gaseous fuel supply valve 81 moves between an open position which advances gaseous fuel to the second intake conduit 78 and a closed position which prevents advancement of gaseous fuel to the second intake conduit 78. It should be appreciated that the amount of gaseous fuel in a second mixture of air and gaseous fuel advanced by the second gaseous fuel valve 81 controls the ratio of air to gaseous fuel, or air-fuel ratio, advanced to the second combustion chamber 86. Specifically, if it is desired to advance a leaner mixture to the second combustion chamber 86, the second gaseous fuel valve 81 is operated to advance less fuel to the second intake conduit 78. On the other hand, if it is desired to advance a richer mixture to the second combustion chamber 86, the second gaseous fuel valve 81 is operated to advance more gaseous fuel to the second intake conduit 78.

A second intake valve 88 selectively places the plenum chamber 24 in fluid communication with the second combustion chamber 86. The second intake valve 88 is actuated in a known manner by a camshaft (not shown), a pushrod (not shown), and a rocker arm (not shown) driven by the rotation of the crankshaft 50. When the second intake valve 88 is placed in the open position (shown in FIG. 1) air and gaseous fuel is advanced from the second intake conduit 78 to the second combustion chamber 86 via the second intake port 74. When the second intake valve 88 is placed in the closed position (not shown) gaseous fuel is prevented from advancing from the second intake conduit 78 to the second combustion chamber 86 since the second intake valve 88 blocks fluid flow through the second intake port 74.

A second exhaust valve 96 selectively places the second exhaust manifold 94 in fluid communication with the second combustion chamber 86. The second exhaust valve 96 is actuated in a known manner by a camshaft (not shown), a pushrod (not shown), and a rocker arm (not shown) each of which are driven by the rotation of the crankshaft 50. When the second exhaust valve 96 is placed in the open position (not shown) exhaust gases are advanced from the second combustion chamber 86 to the second exhaust manifold 94 via a fluid path that includes the second exhaust port 76 and the second exhaust conduit 92. When the second exhaust valve 96 is placed in the closed position (shown in FIG. 1) exhaust gases are prevented from advancing from the second combustion chamber 86 to the second exhaust manifold 94 since the second exhaust valve 96 blocks fluid flow through the second exhaust port 76.

The second intake conduit 78 further includes a side wall 85 having a second oil opening 83 defined therein. A second port oil injector 98 is positioned proximate to the second intake conduit 78. In particular, a nozzle (not shown) of the second port oil injector 98 is received through the second oil opening 83 such that the second port oil injector 98 is operable to inject a quantity of lubricating oil into the second intake conduit 78. It should be appreciated that the quantity of lubricating oil is advanced to the second combustion chamber 86 when the second intake valve 88 is positioned in the open position. It should further be appreciated that the lubricating oil passes around the second intake valve 88 so as to lubricate the second intake valve 88 when the lubricating oil is advanced to the second combustion chamber 86.

The engine assembly 10 also includes an oil reservoir 100. The oil reservoir 100 stores a quantity of lubricating oil which is advanced to the first port oil injector 58 and the second port oil injector 98. In particular, an oil pump 102 draws unpressurized lubricating oil from the oil reservoir 100 and advances pressured lubricating oil to the first port oil injector 58 and the second port oil injector 98 via the oil line 104.

The lubricating oil is also used to lubricate other components of the engine assembly 10. In particular, the lubricating oil is used to lubricate engine components in a crankcase 106. The crankcase 106 is secured to the underside of the engine block 28. The crankcase 106 is operable to isolate the crankshaft 50, the first connecting rod 41, the first piston 40, the second connecting rod 81, the second piston 80, and other components of the engine assembly 10 from the environment that surrounds the engine assembly 10. Unpressurized lubricating oil is drawn from the oil reservoir 100 by the oil pump 102. The oil pump 102 then advances pressurized lubricating oil to the crankcase 106 via the oil supply conduit 110. In the crankcase 106, the lubricating oil is directed to lubricate the engine components housed in the crankcase 106. Excess oil in the crankcase 106 is then returned to the oil reservoir 100 via the oil exhaust conduit 112. This excess can then be either (i) returned to the crankcase 106 to further lubricate engine components housed in the crankcase 106, or (ii) advanced to the first port oil injector 58 or the second port oil injector 98 and subsequently advanced with the gaseous fuel to the first combustion chamber 46 or the second combustion chamber 86, respectively. It should be appreciated that the lubricating oil advanced to the first combustion chamber 46 and second combustion chamber 86 will be consumed during a combustion process described below.

The engine assembly 10 further includes an engine control module 120, a speed sensor 122, a first vibration sensor such as a first detonation sensor 124, and a second vibration sensor such as a second detonation sensor 126. The engine control unit 120 is operative to receive signals from the speed sensor 122, the first detonation sensor 124, and the second detonation sensor 126 and generate injector control signals which control the quantity of lubricating oil injected by the first port oil injector 58 and the second port oil injector 98. The engine control unit 120 is further operable to send fuel control signals to the first gaseous fuel supply valve 41 and the second gaseous fuel supply valve 81 via the signal lines 140 and 142, respectively. The fuel control signals cause the first gaseous fuel supply valve 41 and the second gaseous fuel supply valve 81 to control the air-fuel ratio of the air and gaseous fuel mixture advanced to the first combustion chamber 46 and the second combustion chamber 86, respectively, as described above.

The speed sensor 122 measures the rotational speed of the crankshaft 50 and generates a speed signal which is transmitted to the engine control unit 120 via the signal line 128.

The first detonation sensor 124 is secured to the engine block 28 proximate to first engine head 32. The first detonation sensor 124 is operable to detect the vibration caused during the combustion of the gaseous fuel in the first combustion chamber 46 and generate a first control signal which is sent to the engine control unit 120 via the signal line 130. A first normal control signal is sent to the engine control unit 120 when the first cylinder assembly 26 is working in a normal mode of operation and a first abnormal control signal is sent to the engine control unit 120 when the first cylinder assembly 26 is working in an abnormal mode of operation.

In order to provide meaning to the phrase "normal mode of operation" as it is used herein, it should be understood that the first cylinder assembly 26 is operating in a normal mode of operation when the first gaseous fuel supply valve 41 is controlling the amount of gaseous fuel advanced to the first intake conduit 38 by moving between the open and closed positions.

Moreover, in order to provide meaning to the phrase "abnormal mode of operation" as it is used herein, it should be understood that the first cylinder assembly 26 is operating in an abnormal mode of operation when the first gaseous fuel valve 41 becomes stuck in the open position whereby the gaseous fuel is advanced to the first intake conduit 38 in an uncontrolled manner. Because the flow of gaseous fuel is not controlled, an overly rich mixture of gaseous fuel and air may be advanced to the first combustion chamber 46. When the overly rich mixture of gaseous fuel and air is combusted in the first combustion chamber 46, a severe vibration is generated in the first combustion chamber 46 during operation of the first cylinder assembly 26.

The second detonation sensor 126 is secured to the engine block 28 proximate to the second engine head 72. The second detonation sensor 126 is operable to detect the vibration caused during the combustion of the gaseous fuel in the second combustion chamber 86 and generate a second control signal which is sent to the engine control unit 120 via the signal line 132. A second normal control signal is sent to the engine control unit 120 when the second cylinder assembly 66 is working in a normal mode of operation and a second abnormal control signal is sent to the engine control unit 120 when the second cylinder assembly 66 is working in an abnormal mode of operation.

Industrial Applicability

In operation, the first cylinder assembly 26 operates in a four stroke cycle. The first stroke is an intake stroke, during which the first exhaust valve 56 is positioned in the closed position and the first intake valve 48 is positioned in the open position.

Prior to the intake stroke, the engine control unit 120 instructs the first port oil injector 58 to inject a quantity of fuel into the first intake conduit 38. To determine the amount of lubricating oil to inject, the engine control unit 120 monitors a number of parameters such as engine speed, pressure of gaseous fuel in the gaseous fuel source 18, pressure of air in the plenum chamber 24 and temperature of air in the plenum chamber 24. The engine control unit 120 then controls the amount of lubricating oil advanced to the first intake conduit 38 based on these parameters.

For example, if each of the measured parameters except engine speed remain constant, the quantity of fuel to be injected into the first intake conduit 38 is controlled by a first injector control signal generated by the engine control unit 120 in response to the speed signal received from the speed sensor 122. The first injector control signal is sent to the first port injector 58 via a signal line 136. Specifically, if the speed sensor 122 generates a first speed signal indicating that the crankshaft 50 is rotating at a first rotational speed, a first injector control signal will be generated which causes a first quantity of lubricating oil to be advanced into the first intake conduit 38. If the speed sensor 122 generates a second speed signal indicating that the crankshaft 50 is rotating at a second rotational speed, a second injector control signal will be generated which causes a second quantity of lubricating oil to be advanced into the first intake conduit 38. If the first speed signal corresponds to a crankshaft speed which is less than crankshaft speed indicated by the second speed signal, then the first quantity of lubricating oil is less than the second quantity of lubricating oil injected by the first port oil injector 58. The quantity of lubricating oil advanced to the first intake conduit 38 is adjusted for changes in the other parameters in a similar manner.

During the intake stroke, the first piston 40 is advanced in the general direction of arrow 44 thereby creating a low pressure in the first combustion chamber 46. This low pressure allows gaseous fuel, air, and lubricating oil to be advanced from the first intake conduit 38, past the first intake valve 48, through the first intake port 34, and into the first combustion chamber 46. As the lubricating oil is advanced past the first intake valve 48, a portion of lubricating oil is deposited on the first intake valve 48 so as to lubricate the first intake valve 48.

Advancing to a compression stroke, the first intake valve 48 and the first exhaust valve 56 are both positioned in their respective closed positions. As the first piston 40 moves upward in the general direction of arrow 42, it compresses the gaseous fuel and lubricating oil in the first combustion chamber 46. It should be appreciated that advancing the lubricating oil and gaseous fuel into the first combustion chamber 46 during the intake stroke allows the lubricating oil and gaseous fuel to mix during most of the intake and compression strokes to create a substantially homogeneous mixture of lubricating oil and gaseous fuel. Near the top of the stroke of the first piston 40 (as shown in FIG. 1), the lubricating oil ignites due to the heat generated by compressing the mixture of gaseous fuel and lubricating oil. Due to the combustion properties of the gaseous fuel, the gaseous fuel may not ignite by itself during the compression stroke. However, the ignition of the lubricating oil acts as a pilot ignition source which initiates combustion of the gaseous fuel in the first combustion chamber 46.

Moreover, during some conditions, such as starting the dual fuel engine when the engine assembly 10 is cold, the lubricating oil may not ignite in the first combustion chamber 46 during the compression stroke. Under these conditions, the spark plug 39 is provided to ignite the fuel in the first combustion chamber 46. In particular, the spark plug 39 provides a spark which is timed to ignite the gaseous fuel near the end of the compression stroke.

The ignition of the gaseous fuel and lubricating oil advances the first cylinder assembly 26 a power stroke in which the first intake valve 48 and the first exhaust valve 56 are both positioned in their respective closed positions. As the gaseous fuel and lubricating oil are combusted, exhaust gases are formed. The formation of the exhaust gases generates pressure. This pressure acts upon the first piston 40 to create a force which drives the first piston 40 in the general direction of arrow 44. The movement of the first piston 40 in the general direction of arrow 44 causes the crankshaft 50 to rotate in the general direction of arrow 51.

Thereafter, the first piston assembly 26 is advanced to an exhaust stroke during which the first exhaust valve 56 is positioned in the open position and the first intake valve 48 is positioned in the closed position. Since the pressure generated by the formation of exhaust gases in the first combustion chamber 46 is greater than the pressure in the first exhaust manifold 54, the exhaust gases advance from the first combustion chamber 46, through the first exhaust port 36, through the first exhaust conduit 52, and into the first exhaust manifold 54. From the first exhaust manifold 54 the exhaust gases are advanced to a turbocharger (not shown) prior to being exhausted to the atmosphere.

Operation of the first cylinder assembly 26 in the first abnormal mode of operation is sensed by the first detonation sensor 124 when the first gas supply valve 41 becomes stuck in the open position and advances an overly rich mixture of gaseous fuel and air to the first combustion chamber 46. Combustion of this overly rich mixture in the first combustion chamber 46 causes a severe vibration which is detected by the first detonation sensor 124. Upon detecting the severe vibration, the first detonation sensor 124 generates a first abnormal control signal which is sent to the engine control unit 120 via the signal line 130.

In response to receiving the first abnormal control signal from the first detonation sensor 124, the engine control unit 120 generates a first injector control signal which causes the first oil injector 58 to cease to inject lubricating oil into the first intake conduit 38. It should be appreciated that because no lubricating oil is injected into the first intake manifold 38, no lubricating oil is advanced to the first combustion chamber 46 during the intake stroke. Furthermore, no lubricating oil is present to ignite and initiate combustion of the gaseous fuel during the compression stroke. Because the gaseous fuel is not ignited during a compression stroke, further severe vibrations are not generated.

The second cylinder assembly 66 operates in a four stroke cycle similar to the four stroke cycle of the first cylinder assembly 26. The first stroke is an intake stroke, during which the second exhaust valve 96 is positioned in the closed position and the second intake valve 88 is positioned in the open position as shown in FIG. 1.

Prior to the intake stroke, the engine control unit 120 instructs the second port oil injector 98 to inject a quantity of fuel into the second intake conduit 78. To determine the amount of lubricating oil to inject, the engine control unit 120 monitors a number of parameters such as engine speed, pressure of gaseous fuel in the gaseous fuel source 18, pressure of air in the plenum chamber 24 and temperature of air in the plenum chamber 24. The engine control unit 120 then controls the amount of lubricating oil advanced to the second intake conduit 78 based on these parameters.

For example, if each of the measured parameters except engine speed remain constant, the quantity of fuel to be injected into the second intake conduit 78 is controlled by a second injector control signal generated by the engine control unit 120 in response to the speed signal received from the speed sensor 122. The second injector control signal is sent to the second port injector 98 via a signal line 134. Specifically, if the speed sensor 122 generates a first speed signal indicating that the crankshaft 50 is rotating at a first rotational speed, a second injector control signal causes a first quantity of lubricating oil to be advanced into the second intake conduit 78. If the speed sensor 122 generates a second speed signal indicating that the crankshaft 50 is rotating at a second rotational speed, a second injector control signal causes a second quantity of lubricating oil to be advanced into the second intake conduit 78. If the first speed signal corresponds to a crankshaft speed which is less than the crankshaft speed indicated by the second speed signal, then the first quantity of lubricating oil is less than the second quantity of lubricating oil injected by the second port oil injector 98. The quantity of lubricating oil advanced to the second intake conduit 98 may be adjusted for changes in the other parameters in a similar manner During the intake stroke, the second piston 80 is advanced in the general direction of arrow 84 thereby creating a low pressure in the second combustion chamber 86. This low pressure allows gaseous fuel, air, and lubricating oil to be advanced from the second intake conduit 78, past the second intake valve 88, through the second intake port 74, and into the second combustion chamber 86. As the lubricating oil is advanced past the second intake valve 88, a portion of the lubricating oil is deposited on the second intake valve 88 so as to lubricate the second intake valve 88.

Advancing to a compression stroke, the second intake valve 88 and the second exhaust valve 96 are both positioned in their respective closed positions. As the second piston 80 moves upward in the general direction of arrow 82, it compresses the gaseous fuel and lubricating oil in the second combustion chamber 86. It should be appreciated that advancing the lubricating oil and gaseous fuel into the second combustion chamber 86 during the intake stroke allows the lubricating oil and gaseous fuel to mix during most of the intake and compression strokes to create a substantially homogeneous mixture of lubricating oil and gaseous fuel. Near the top of the stroke of the second piston 80, the lubricating oil ignites due to the heat generated by compressing the mixture of gaseous fuel and lubricating oil. Due to the combustion properties of the gaseous fuel, the gaseous fuel may not ignite during a the compression stroke. However, the ignition of the lubricating oil acts as a pilot ignition source which initiates combustion of the gaseous fuel in the second combustion chamber 86.

Moreover, during some conditions, such as starting the dual fuel engine when the engine assembly 10 is cold, the lubricating oil in the second combustion chamber 86 may not ignite during the compression stroke. Under these conditions, the spark plug 79 is provided to ignite the fuel in the second combustion chamber 86. In particular, spark plug 79 provides a spark which is timed to ignite the gaseous fuel near the end of the compression stroke.

The ignition of the gaseous fuel and lubricating oil advances the second cylinder assembly 66 to a power stroke in which the second intake valve 88 and the second exhaust valve 96 are both positioned in their respective closed positions. As the gaseous fuel and lubricating oil are combusted, exhaust gases are formed. The formation of the exhaust gases generates pressure. This pressure acts upon the second piston 80 to create a force which drives the second piston 80 in the general direction of arrow 84. The movement of the second piston 80 in the general direction of arrow 84 causes the crankshaft 50 to rotate in the general direction of arrow 51.

Thereafter, the second piston assembly 66 is advanced to an exhaust stroke during which the second exhaust valve 96 is positioned in the open position and the second intake valve 88 is positioned in the closed position. Since the pressure generated by the exhaust gases in the second combustion chamber 86 is greater than the pressure in the second exhaust manifold 94, the exhaust gases advance from the second combustion chamber 86, through the second exhaust port 76, through the second exhaust conduit 92, and into the second exhaust manifold 94. From the second exhaust manifold 94 the exhaust gases are advanced to a turbocharger (not shown) prior to being exhausted to the atmosphere.

Operation of the second cylinder assembly 66 in the second abnormal mode of operation is sensed by the second detonation sensor 126 when the second intake valve 88 becomes stuck in the open position and advances an overly rich mixture of gaseous fuel and air to the second combustion chamber 86. Combustion of this overly rich mixture in the second combustion chamber 86 causes a severe vibration which is detected by the second detonation sensor 126. Upon detecting the severe vibration, the second detonation sensor 126 generates a second abnormal control signal which is to the engine control unit 120 via the signal line 132.

In response to receiving the second abnormal control signal from the second detonation sensor 126, the engine control unit 120 generates a second injector control signal which causes the second oil injector 98 to cease to inject lubricating oil into the second intake conduit 78. It should be appreciated that because no lubricating oil is injected into the second intake manifold 78, no lubricating oil is advanced to the second combustion chamber 86 during the intake stroke. Furthermore, no lubricating oil is present to ignite and initiate combustion of the gaseous fuel during the compression stroke. Because the gaseous fuel is not ignited during a compression stroke and further severe vibrations are not generated.

It should be appreciated that the engine control unit 120 is operable to send a first injector control signal to the first port oil injector 58 which causes the first port oil injector 58 to cease to inject lubricating oil to the first intake conduit 38, thereby preventing combustion in the first cylinder assembly 26, while simultaneously sending a second injector control signal to the second port oil injector 98 causing a quantity of oil to be injected to the second intake conduit 78. Similarly, the engine control unit 120 is operable to send a second injector control signal to the second port oil injector 98 which causes the second port oil injector 98 to cease to inject lubricating oil to the second intake conduit 78, thereby preventing combustion in the second cylinder assembly 66, while simultaneously sending a first injector control signal to the first port oil injector 58 causing a quantity of oil to be injected to the first intake conduit 38. It should be appreciated that by independently controlling the flow of lubricating oil to each of the first cylinder assembly 26 and second cylinder assembly 66, the engine control unit 120 can prevent combustion in the first combustion chamber 46 or the second combustion chamber 86 if an abnormal mode of operation is detected in either of the first combustion chamber 46 or the second combustion chamber 86, respectively.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. An engine assembly, comprising:

a plenum member having an inlet opening and an outlet opening defined therein;

an air source in fluid communication with said inlet opening;

a fuel combustion assembly which includes (i) an engine block having a piston cylinder defined therein, (ii) an engine head secured to said engine block and having an intake port defined therein, and (iii) a piston which translates within said piston cylinder, wherein said piston, said piston cylinder, and said engine head cooperate so as to define a combustion chamber;

an intake conduit interposed between said outlet opening and said intake port so as to provide fluid communication between said plenum member and said combustion chamber, said intake conduit having an oil opening defined therein;

a gaseous fuel source in fluid communication with said intake conduit;

a gaseous fuel supply valve which controls the amount of gaseous fuel advanced from said gaseous fuel source to said intake conduit;

a port oil injector operable to inject lubricating oil through said oil opening; and an intake valve positionable between an open position and a closed position, wherein (i) said intake valve enables fluid communication between said intake port and said combustion chamber when said intake valve is positioned in said open position, and (ii) said intake valve prevents fluid communication between said intake port and said combustion chamber when said intake valve is positioned in said closed position, whereby said lubricating oil (i) lubricates said intake valve as said lubricating oil advances from said intake conduit to said combustion chamber during an intake stroke of said engine assembly, and (ii) combusts so as to ignite a mixture of gaseous fuel and air in said combustion chamber during a compression stroke of said engine assembly.

2. The engine assembly of claim 1, further comprising a vibration sensor operable to (i) sense when said fuel combustion assembly is operating in a normal mode of operation and generate a normal control signal in response thereto, and (ii) sense when said fuel combustion assembly is operating in an abnormal mode of operation and generate an abnormal control signal in response thereto, wherein:

said port oil injector ceases operation in response to generation of said abnormal control signal.

3. The engine assembly of claim 2, further comprising (i) a crankshaft which rotates in response to translation of said piston, (i) an engine speed sensor which detects speed of rotation of said crankshaft and generates speed signals in response thereto, and (iii) an engine control unit for receiving said speed signals and generating injector control signals in response thereto, wherein:

said port oil injector injects said lubricating oil through said oil opening in response to generation of said injector control signals.

4. The engine assembly of claim 3, wherein:

said speed signals include a first speed signal and a second speed signal, said first speed signal is generated by said speed sensor in response to detecting a first rotational speed of said crankshaft, said second speed signal is generated by said speed sensor in response to detecting a second rotational speed of said crankshaft, and said first speed is less than said second speed.

5. The engine assembly of claim 4, wherein:

said port oil injector injects a first quantity of said lubricating oil through said oil opening in response to generation of said first speed signal, said port oil injector injects a second quantity of said lubricating oil through said oil opening in response to generation of said second speed signal, and said first quantity of said lubricating oil is less than said second quantity of said lubricating oil.

6. The engine assembly of claim 5, wherein:

said engine control unit (i) receives said first speed signal and generates a first injector control signal in response thereto, and (ii) receives said second speed signal and generates a second injector control signal in response thereto, and said port oil injector (i) injects said first quantity of said lubricating oil through said oil opening in response to generation of said first injector control signal, and (ii) injects said second quantity of said lubricating oil through said oil opening in response to generation of said second injector control signal.

7. The engine assembly of claim 2, wherein:

said gaseous fuel supply valve moves between said open position and said closed position when said fuel combustion assembly is operating in said normal mode of operation said gaseous fuel supply valve does not move between said open position and said closed position when said fuel combustion assembly is operating in said abnormal mode of operation.

8. The engine assembly of claim 1, further comprising (i) an oil reservoir, (ii) a crankcase, and (iii) an oil supply conduit interposed between said oil reservoir and said crankcase, wherein:

said lubricating oil is pumped from said oil reservoir to said crankcase via said oil supply conduit so as to lubricate engine components located in said crankcase, and said lubricating oil is also pumped from said oil reservoir to said port oil injector so as to lubricate said intake valve.

9. The engine assembly of claim 8, further comprising an oil exhaust conduit which is interposed between said oil reservoir and said crankcase, wherein:

said lubricating oil is advanced from said crankcase to said oil reservoir via said exhaust oil conduit so as to return said lubricating oil from said crankcase to said reservoir.

10. The engine assembly of claim 1, wherein:

said oil opening is defined in a side wall of said intake conduit, and said port oil injector is positioned within said oil opening.

11. A method of operating an engine assembly which includes (i) a plenum member having an outlet opening defined therein, (ii) a fuel combustion assembly which includes (A) an engine block having a piston cylinder defined therein, (B) an engine head secured to the engine block and having an intake port defined therein, and (C) a piston which translates within the piston cylinder, wherein the piston, the piston cylinder, and the engine head cooperate so as to define a combustion chamber, (iii) an intake conduit interposed between the outlet opening and the intake port so as to provide fluid communication between the plenum member and the combustion chamber, the intake conduit having an oil opening defined therein, (iv) a gaseous fuel supply valve operable to advance gaseous fuel from a gaseous fuel source to the intake conduit, (v) a port oil injector operable to inject lubricating oil through the oil opening, and (vi) an intake valve positionable between an open position and a closed position, wherein (A) the intake valve enables fluid communication between the intake port and the combustion chamber when the intake valve is positioned in the open position, and (B) the intake valve prevents fluid communication between the intake port and the combustion chamber when the intake valve is positioned in the closed position, comprising the steps of:

advancing gaseous fuel through the intake conduit, and into the combustion chamber during an intake stroke of the engine assembly;

injecting lubricating oil with the port oil injector through the oil opening of the intake conduit;

advancing the lubricating oil from the intake conduit to the combustion chamber during the intake stroke of the engine assembly, whereby the lubricating oil lubricates the intake valve during the advancing step; and combusting the lubricating oil in the combustion chamber so as to ignite the gaseous fuel during a compression stroke of the engine assembly.

12. The method of claim 11, further comprising a vibration sensor, wherein the injecting step further comprises the steps of:

sensing when the fuel combustion assembly is operating in a normal mode of operation with the vibration sensor and generating a normal control signal in response thereto;

sensing when the fuel combustion assembly is operating in an abnormal mode of operation with the vibration sensor and generating an abnormal control signal in response thereto; and ceasing injection of lubricating oil with the port oil injector in response to generation of the abnormal control signal.

13. The method of claim 11, further comprising (i) a crankshaft which rotates in response to translation of the piston, (ii) an engine speed sensor, and (iii) an engine control unit, the injecting step further including the steps of:

detecting rotation of the crankshaft with the speed sensor and generating a speed signal in response to the detecting step;

receiving the speed signal from the speed sensor with the engine control unit and generating an injector control signal in response to the receiving step; and injecting a quantity of lubricating oil with the port oil injector in response to the injector control signal.

14. The method of claim 13, the injecting step further includes the steps of:

generating a first speed signal with the speed sensor in response to detecting a first rotational speed of the crankshaft, and generating a second speed signal with the speed sensor in response to detecting a second rotational speed of the crankshaft, wherein the first speed is less than the second speed.

15. The method of claim 14, further including the steps of:

injecting a first quantity of the lubricating oil through the oil opening in response to generation of the first speed signal; and injecting a second quantity of the lubricating oil through the oil opening in response to generation of the second speed, wherein the first quantity of the lubricating oil is less than the second quantity of the lubricating oil.

16. The method of claim 15, further comprising the steps of:

receiving the first speed signal and generating a first injector control signal in response thereto;

receiving the second speed signal and generating a second injector control signal in response thereto;

injecting the first quantity of the lubricating oil through the oil opening in response to generation of the first injector control signal; and injecting the second quantity of the lubricating oil through the oil opening in response to generation of the second injector control signal.

17. The method of claim 12, wherein:

the gaseous fuel supply valve moves between the open position and the closed position when the fuel combustion assembly is operating in the normal mode of operation, and the gaseous fuel supply valve does not move between the open position and the closed position when the fuel combustion assembly is operating in the abnormal mode of operation.

18. An engine assembly, comprising:

a plenum member having an inlet opening, a first outlet opening, and a second outlet opening defined therein;

an air source in fluid communication with said inlet opening;

an engine block having a first piston cylinder and a second piston cylinder defined therein;

a first engine head secured to said engine block and having a first intake port defined therein;

a second engine head secured to said engine block and having a second intake port defined therein;

a first piston which translates within said first piston cylinder, wherein said first piston, said first piston cylinder, and said first engine head cooperate so as to define a first combustion chamber;

a second piston which translates within said second piston cylinder, wherein said second piston, said second piston cylinder, and said second engine head cooperate so as to define a second combustion chamber;

a first intake conduit interposed between said first outlet opening and said first intake port so as to provide fluid communication between said plenum member and said first combustion chamber, said first intake conduit having a first oil opening defined therein;

a second intake conduit interposed between said second outlet opening and said second intake port so as to provide fluid communication between said plenum member and said second combustion chamber, said second intake conduit having a second oil opening defined therein;

a gaseous fuel source in fluid communication with said first intake conduit and said second intake conduit;

a first gaseous fuel supply valve which controls the amount of gaseous fuel advanced from said gaseous fuel source to said first intake conduit;

a second gaseous fuel supply valve which controls the amount of gaseous fuel advanced from said gaseous fuel source to said second intake conduit;

a first port oil injector operable to inject lubricating oil through said first oil opening;

a second port oil injector operable to inject lubricating oil through said second oil opening;

a first intake valve positionable between a first intake valve open position and a first intake valve closed position, wherein (i) said first intake valve enables fluid communication between said first intake port and said first combustion chamber when said first intake valve is positioned in said first intake valve open position, and (ii) said first intake valve prevents fluid communication between said first intake port and said first combustion chamber when said first intake valve is positioned in said first intake valve closed position;

a second intake valve positionable between a second intake valve open position and a second intake valve closed position, wherein (i) said second intake valve enables fluid communication between said second intake port and said second combustion chamber when said second intake valve is positioned in said second intake valve open position, and (ii) said second intake valve prevents fluid communication between said second intake port and said second combustion chamber when said second intake valve is positioned in said second intake valve closed position, whereby said lubricating oil (i) lubricates said first intake valve as said lubricating oil advances from said first intake conduit to said first combustion chamber during a first piston intake stroke, and (ii) combusts so as to ignite a first mixture of gaseous fuel and air in said first combustion chamber during a first piston compression stroke, and whereby said lubricating oil (i) lubricates said second intake valve as said lubricating oil advances from said second intake conduit to said second combustion chamber during a second piston intake stroke, and (ii) combusts so as to ignite a second mixture of gaseous fuel and air in said second combustion chamber during a second piston compression stroke.

19. The engine assembly of claim 18, further comprising:

a first vibration sensor operable to (i) sense when said first fuel combustion assembly is operating in a first normal mode of operation and generate a first normal control signal in response thereto, and (ii) sense when said first fuel combustion assembly is operating in a first abnormal mode of operation and generate an first abnormal control signal in response thereto; and a second vibration sensor operable to (i) sense when said second fuel combustion assembly is operating in a second normal mode of operation and generate a second normal control signal in response thereto, and (ii) sense when said second fuel combustion assembly is operating in a second abnormal mode of operation and generate a second abnormal control signal in response thereto, wherein said first port oil injector ceases operation in response to generation of said first abnormal control signal, and wherein said second port oil injector continues operation in response to generation of said second normal control signal.

20. The engine assembly of claim 19, wherein:

said second port oil injector ceases operation in response to generation of said second abnormal control signal, and said first port oil injector continues operation in response to generation of said first normal control signal.

* * * * *